(12) United States Patent
Huang

(10) Patent No.: US 7,369,402 B2
(45) Date of Patent: May 6, 2008

(54) FASTENER AND ELECTRICAL APPARATUS

(75) Inventor: Chien-Chiang Huang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 414 days.

(21) Appl. No.: 11/109,807

(22) Filed: Apr. 20, 2005

(65) Prior Publication Data

US 2005/0237709 A1    Oct. 27, 2005

(30) Foreign Application Priority Data

Apr. 23, 2004  (TW) ............... 93111530 A

(51) Int. Cl.
*G06F 1/16* (2006.01)
(52) U.S. Cl. ............... 361/685; 312/223.1; 312/223.2
(58) Field of Classification Search ........ 361/679–685, 361/724–727, 818, 817; 312/223.1, 223.2; 369/75.11–82
See application file for complete search history.

(56) References Cited

U.S. PATENT DOCUMENTS

| | | | | |
|---|---|---|---|---|
| 6,122,165 A | * | 9/2000 | Schmitt et al. | 361/685 |
| 6,719,385 B1 | * | 4/2004 | Adams et al. | 312/334.1 |
| 6,882,528 B2 | * | 4/2005 | Chuang | 361/685 |
| 2002/0101713 A1 | * | 8/2002 | Eland | 361/686 |
| 2003/0174464 A1 | * | 9/2003 | Funawatari et al. | 361/685 |
| 2006/0061954 A1 | * | 3/2006 | Lam | 361/685 |

* cited by examiner

*Primary Examiner*—Jayprakash Gandhi
*Assistant Examiner*—Anthony Q Edwards
(74) *Attorney, Agent, or Firm*—Birch, Stewart, Kolasch & Birch, LLP

(57) ABSTRACT

A fastener buckles a hard disk driver (HDD) in a first fasten portion of a case. The fastener comprises a second fasten portion and a third fasten portion. The second fasten portion buckles a first hole on the HDD. A first side of the third fasten portion connects with the second fasten portion. At least one part of the third fasten portion buckles the first fasten portion so that the HDD is fastened to the case.

21 Claims, 8 Drawing Sheets

FASTENER AND ELECTRICAL APPARATUS

BACKGROUND OF THE INVENTION

1. Field of Invention

The invention relates to a fastener and, in particular, to a fastener for buckling a hard disk drive on a case.

2. Related Art

Disk drives, such as floppy disk drives (FDD), hard disk drives (HDD), optical disk drives, and etc, on computers are fastened onto the case using several screws. Afterwards, power and signal cords are connected to the disk drives for normally operations.

Take the case of assembling an HDD on a HDD frame as an example. As shown in FIG. 1, several screw holes 113 are formed on the top surface 111 and side surfaces 112 of the HDD 11. Corresponding rectangular openings 113' and circular openings 113" are formed on the frame 12. The HDD 11 is screwed onto the frame 12 with the screws 13 by using a tool, such as a screwdriver. Finally, the frame 12 is fixed inside a computer case (not shown). When an HDD 11 is out of order or needs to be replaced, it's a boring job to dismount the screws locking the computer case and the frame 12 for removing the HDD 11. This complex procedure is very inconvenient.

Since the computer consists of many electrical devices, each electrical device has to be on common ground with the entire computer, so as to avoid electrostatics and electromagnetic interference (EMI). Accordingly, the working performance of the computer can be maintained. Therefore, copper foils or elastic slices are used to make the HDD and the computer on common ground.

As described above, it is extremely inconvenient and time-consuming to mount or dismount the HDD on the frame. Furthermore, additional costs are needed to purchase copper foils or elastic slices in order to solve the electrostatic and EMI problems.

Therefore, it is an important subjective of the invention to provide a fastener and an electrical apparatus with the fastener to solve the above-mentioned disadvantages.

SUMMARY OF THE INVENTION

In view of the foregoing, the invention is to provide a fastener that helps reducing the HDD assembly time.

To achieve the above, a fastener of the invention buckles an HDD in a first fasten portion of a case. The fastener comprises a second fasten portion and a third fasten portion. The second fasten portion buckles a first hole of the HDD. A first side of the third fasten portion connects with the second fasten portion. At least one part of the third fasten portion buckles the first fasten portion, so that the HDD is fastened in the case.

To achieve the above, the invention also provides an electrical apparatus comprising an HDD, a case, and a plurality of fasteners. The HDD has a plurality of first holes. The case has a container and a plurality of first fasten portions, where the fasteners buckle. Each of the fasteners has a second fasten portion and a third fasten portion. The second fasten portion buckles the first hole of the HDD. A first side of the third fasten portion connects to the second fasten portion. At least one part of the third fasten portion buckles the first fasten portion so that the HDD is fixed in the container of the case.

As mentioned above, the fastener of the invention uses the second fasten portion to buckle the first hole of the HDD and the third fasten portion to buckle the first fasten portion. This quickly completes the processing of fixing the HDD in the container. Therefore, the HDD installation time can be reduced efficiently. In addition, since the fastener is partially made, of metal, the HDD and the computer are on common ground that can prevent the HDD from EML Certainly, the fastener can provide anti-shocking effect if it is made of rubber.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
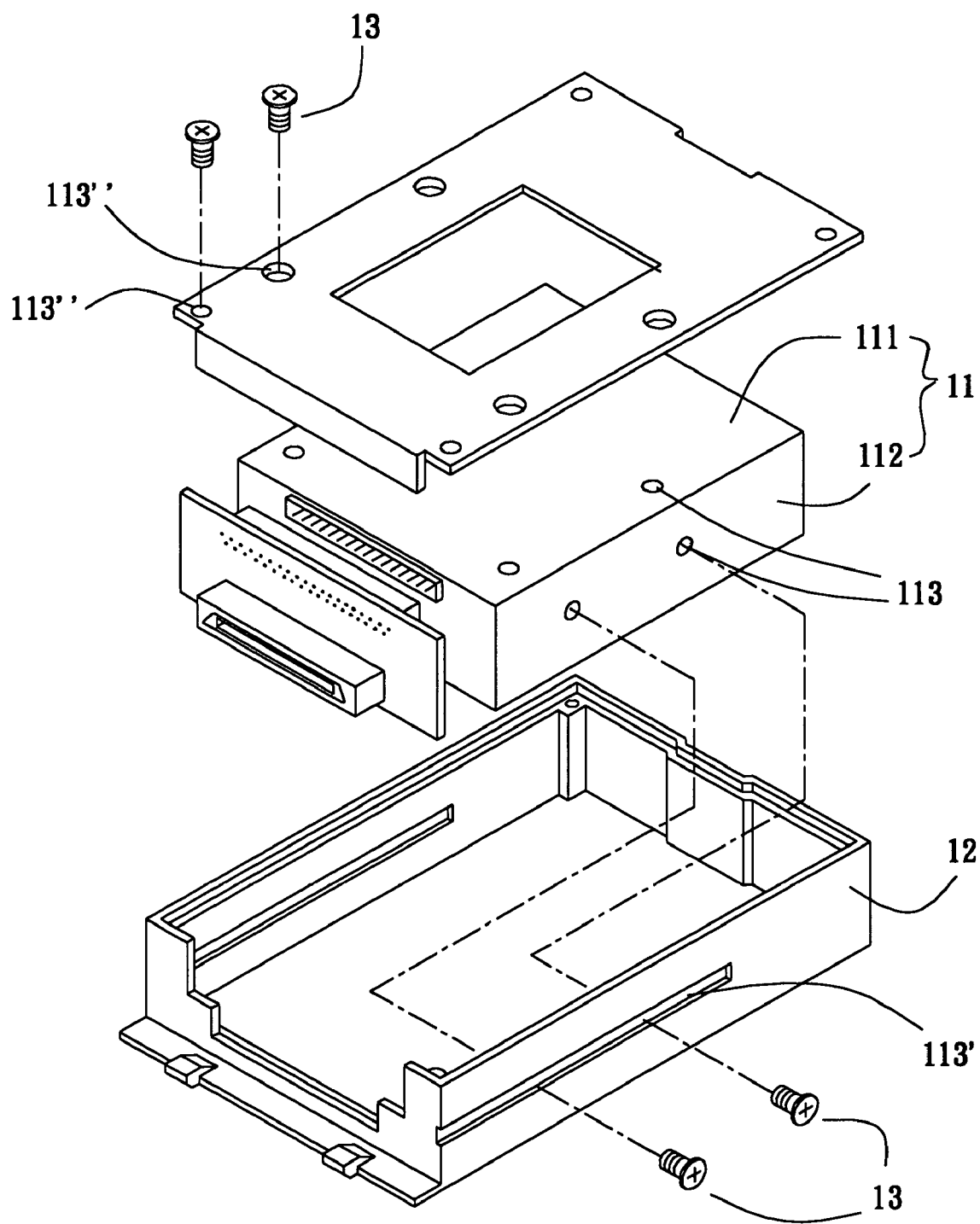
FIG. 1 is a schematic view of installing an HDD in a conventional way.
Figure 2:
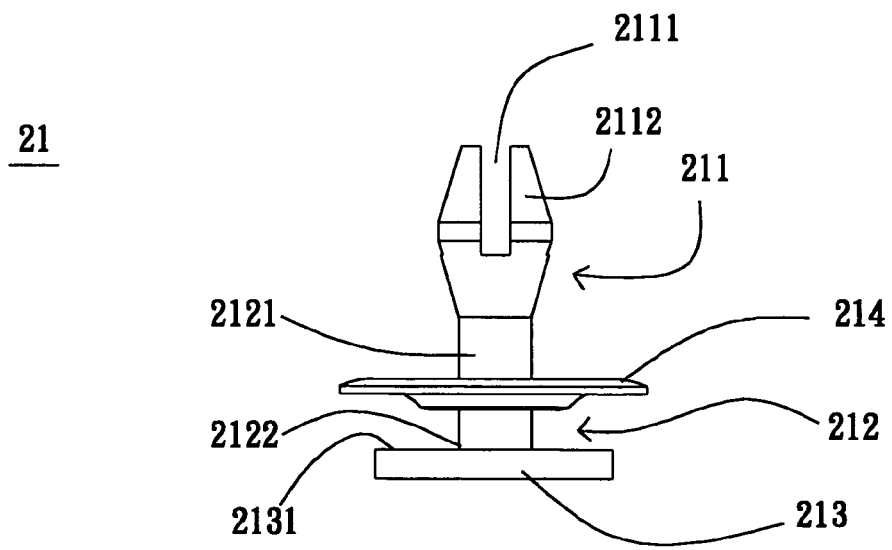
FIG. 2 is a schematic view of a fastener according to a first embodiment of the invention.
Figure 2:
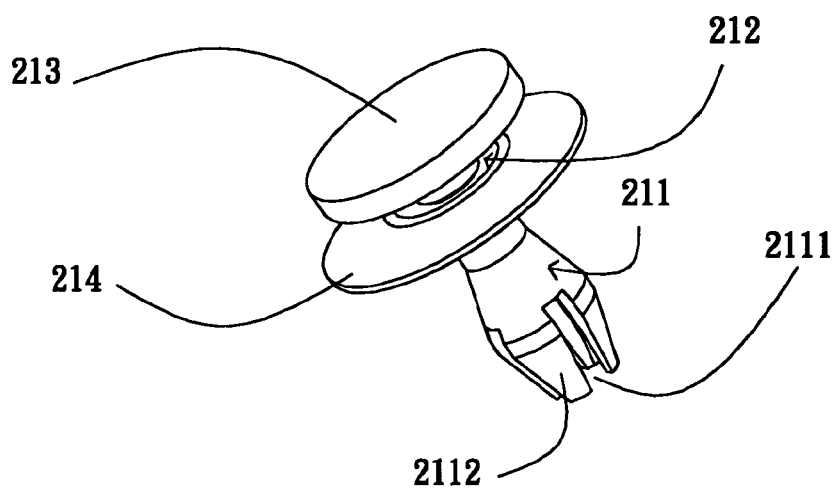
Figure 2:
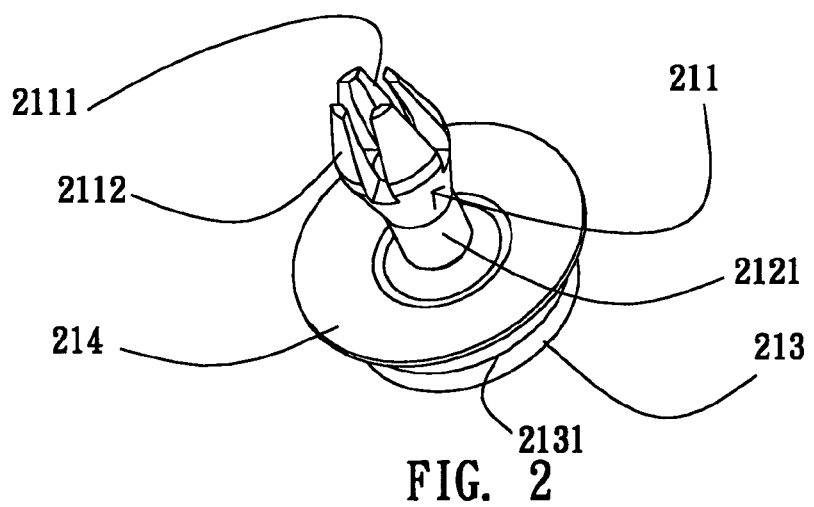

As shown in FIG. 2, the fastener 21 according to a first embodiment of the invention includes a second fasten portion 211 and a third fasten portion 212. The second fasten portion 211 is a cylinder. In this embodiment, one end of the second fasten portion 211 includes at least one groove 2111, which divides the second fasten portion 211 into several second elastic arms 2112.

In the present embodiment, the fastener 21 further includes a first stop part 213, which is connected to a second side 2122 of the third fasten portion 212. A first side 2121 of the third fasten portion 212 is connected to the second fasten portion 211. For example, the third fasten portion 212 is a cylinder, and the first stop part 213 is a circular plate. The fastener 21 also includes an elastic slice 214 positioned on the third fasten portion 212. For example, the elastic slice 214 is also a circular plate installed opposite to the first stop part 213. To be noted, the material of the fastener 21 is, in this embodiment, rubber or some other elastic materials, and the material of the elastic slice 214 is an elastic material, such as a metal.

Figure 3:
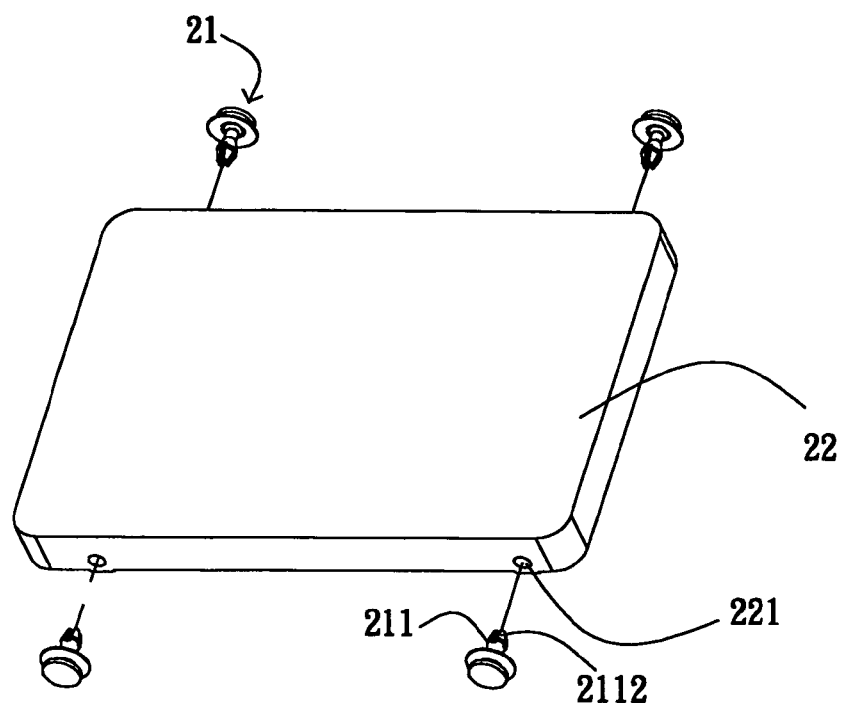
FIG. 3 is a schematic exploded view of the HDD and fastener according to the first embodiment of the invention.

As shown in FIG. 3, the HDD 22 has several first holes 221 on one side surface or a top surface of the HDD 22. In this embodiment, the first holes 211, which are screw holes, are formed on side surfaces of the HDD 22.

Figure 4:
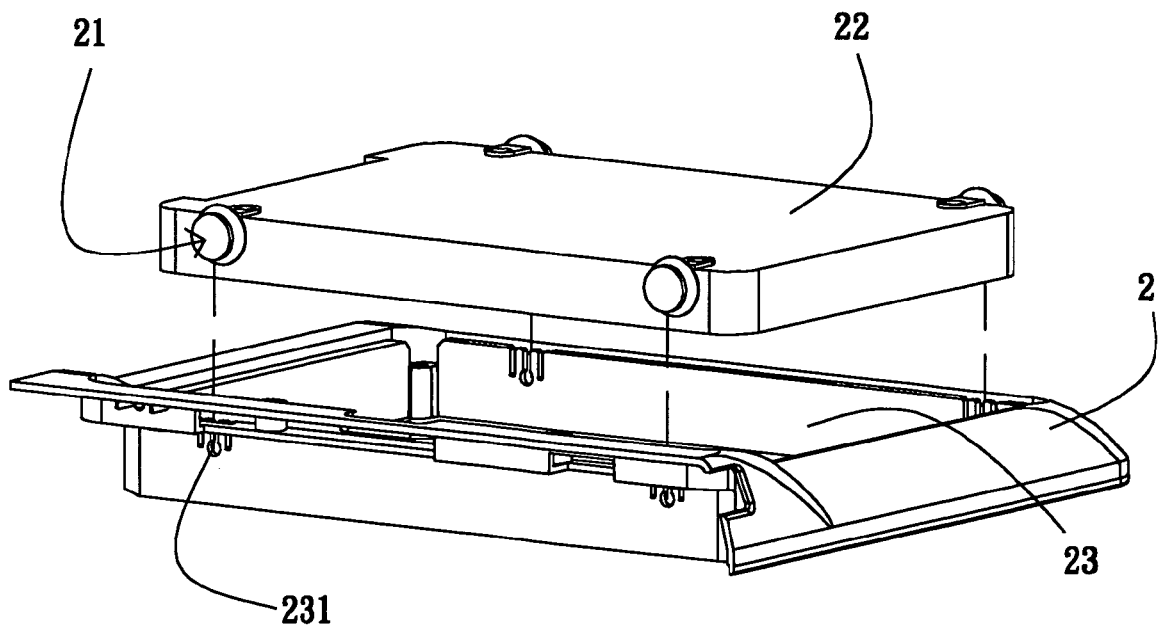
FIG. 4 is a schematic exploded view of the HDD, case and fastener according to the first embodiment of the invention.

With reference to FIG. 4, the case 2 has a container 23, and a plurality of first fasten portions 231 are formed on two opposite sidewalls of the container 23. In the current embodiment, the number and positions of the first fasten portions 231 are in accordance with those of the first holes 221 on the HDD 22 shown in FIG. 3.

Figure 5:
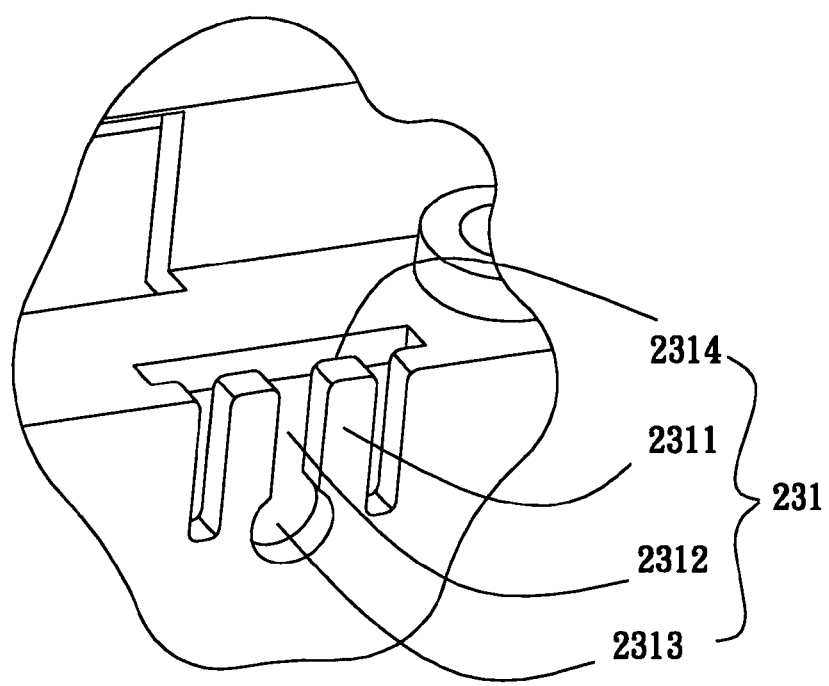
FIG. 5 is a schematic view of a part of the case according to the first embodiment of the invention.

As shown in FIG. 5, the first fasten portion 231 is formed by several first elastic arms 2311. The first fasten portion 231 has a rectangular opening 2312 and a circular hole 2313, connected with each other.

For a better understanding of the invention, an explicit example is taken to explain the fastener according to this embodiment of the invention.

With reference to FIG. 3 again, the second fasten portion 211 of the fastener 21 is buckled to the first hole 221 on the HDD 22. Thus, the second elastic arms 2112 are inserted into the first hole 221, and the connection of the second elastic arms 2112 and first hole 221 is maintained. In this embodiment, four fasteners 21 are used to buckle the four first holes 221 on the HDD 22.

Figure 6:
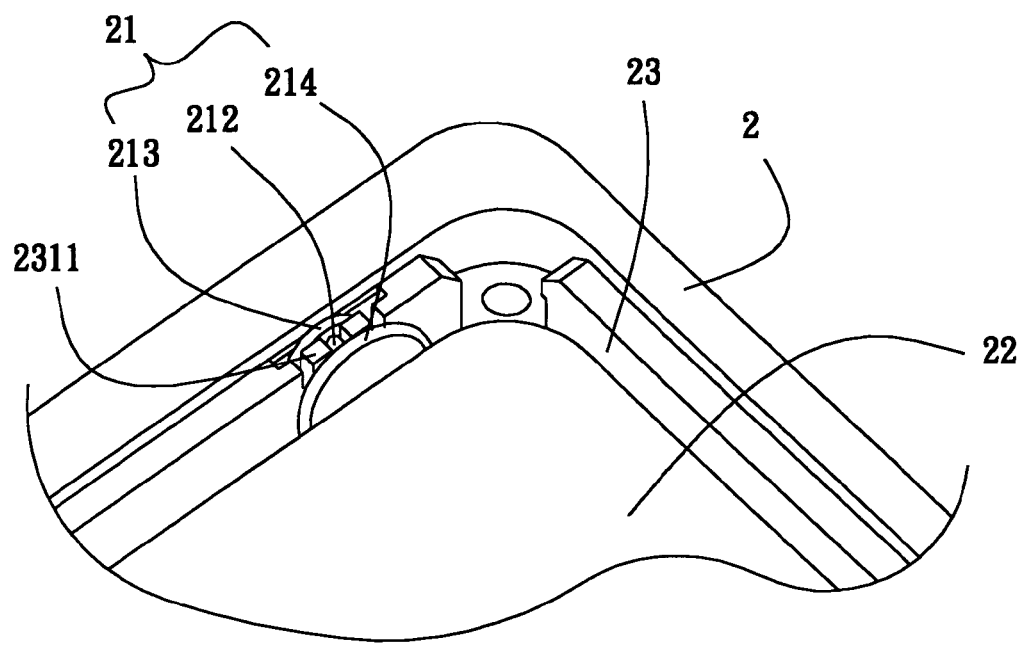
FIG. 6 is an assembly diagram of a part of the HDD, case and fastener according to the first embodiment of the invention.
Figure 7:
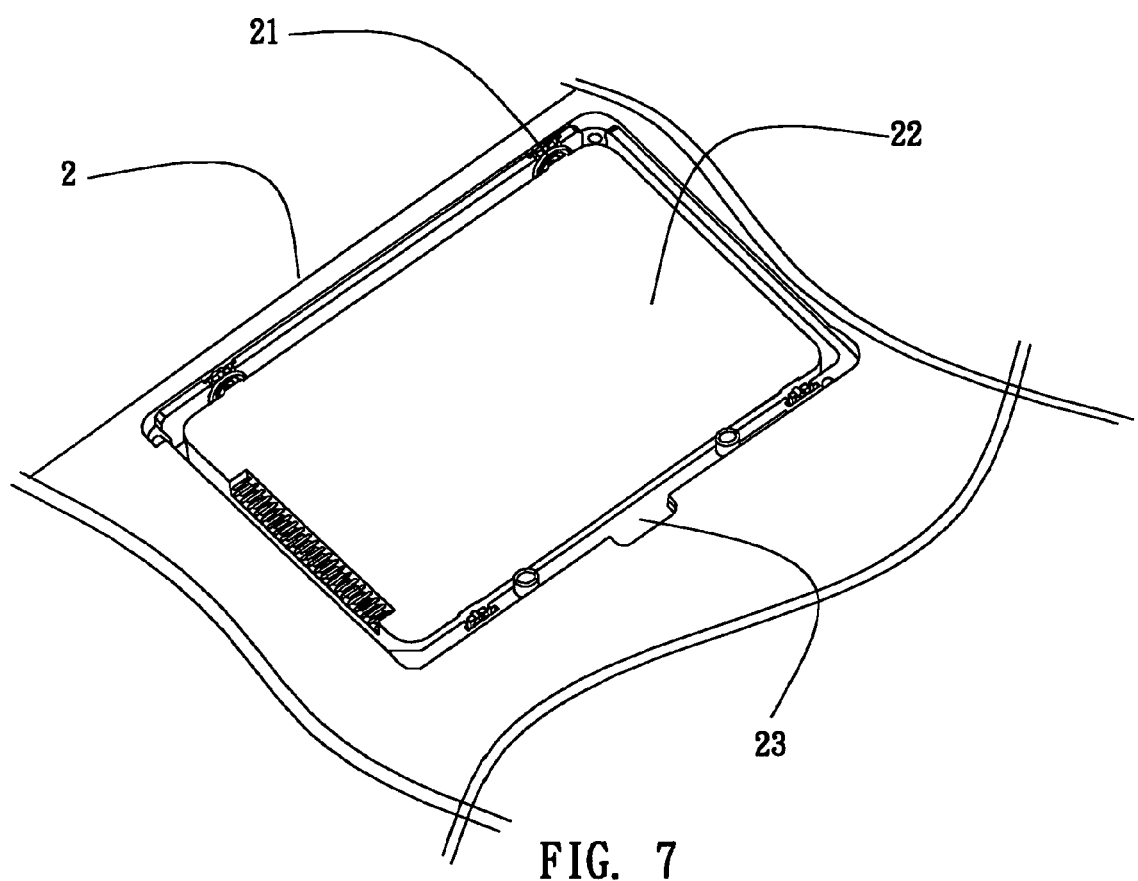
FIG. 7 is an assembly diagram of the HDD, case and fastener according to the first embodiment of the invention.

As shown in FIGS. 4 to 6, the HDD 22 is installed in the first fasten portion 231 of the case 2. In this embodiment, the first fasten portion 231 is disposed in the container 23. When the HDD 22 is mounted to the container 23, the fastener 21 buckles the first fasten portion 231. That is, at least a part of the third fasten portion 212 buckles into the first elastic arms 2311. In other words, the third fasten portion 212 buckles the circular hole 2313 of the first fasten portion 231. At this moment, the first elastic arms 2311 are located between the elastic slice 214 and the first stop part 213, and the elastic slice 214 is in contact with the HDD 22. This fixes the HDD 22 in the case 2, as shown in FIG. 7.

Figure 8:
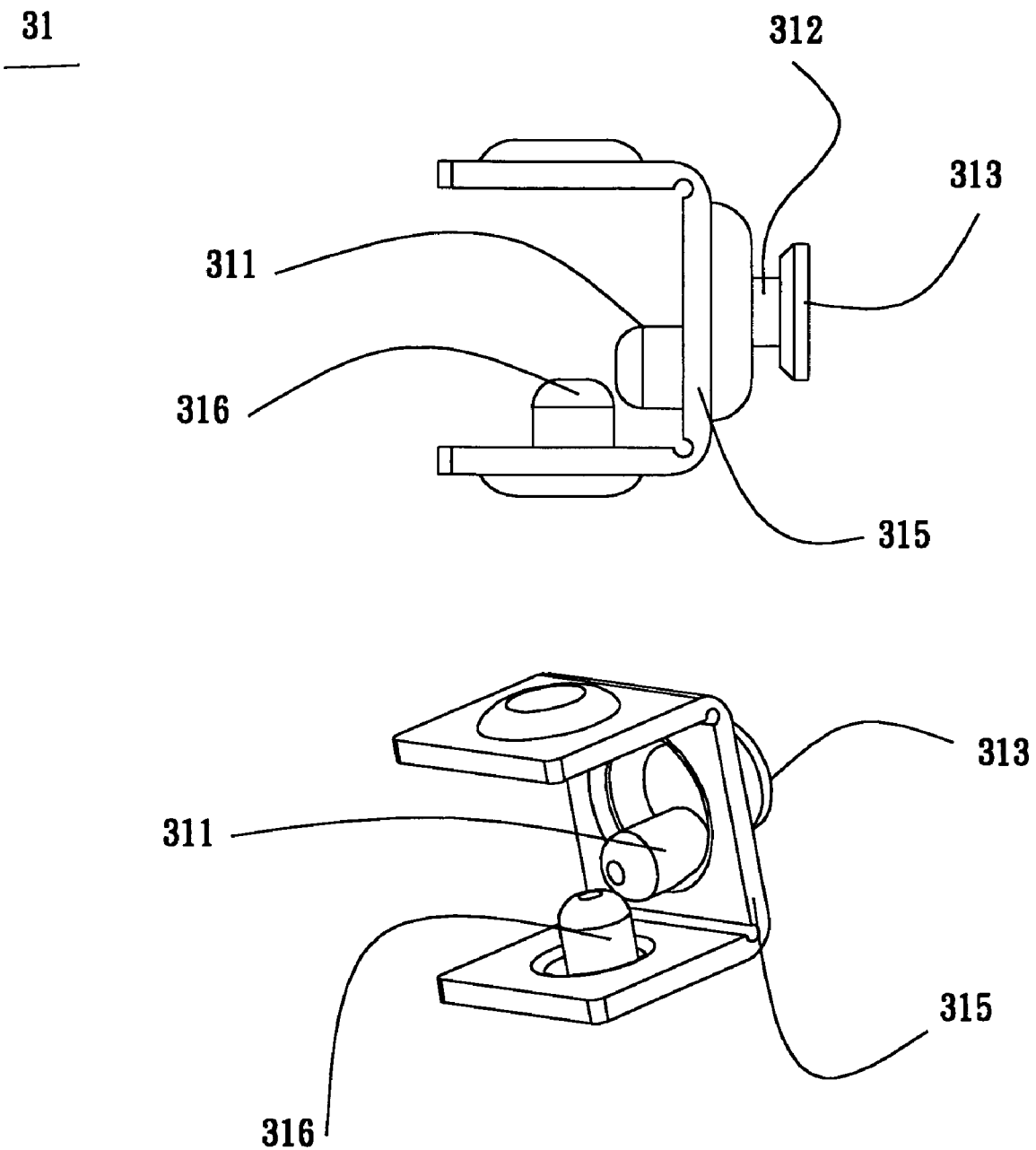
FIG. 8 is a schematic view of a fastener according to a second embodiment of the invention.

As shown in FIGS. 2, 5 and 6, the third side 2131 of the first stop part 213 is in contact with the fourth side 2314 of the first fasten portion 231, which is an outer wall of the container 23. Moreover, the material of the fastener 21 is rubber, which can provide an anti-shocking effect for the HDD 22. The material of the elastic slice 214 is a metal. In this case, the HDD 22 and the container 23 have the same ground, which can prevent the HDD 22 from EML As shown in FIG. 8, a fastener 31 according to a second embodiment of the invention includes a second fasten portion 311, a third fasten portion 312, a first stop part 313, a second stop part 315, and at least a fourth fasten portion 316. The structures and features of the second fasten portion 311, the third fasten portion 312, and the first stop part 313 are the same as those in the previous embodiment, so the detailed descriptions are omitted for concise purpose.

The second stop part 315 is positioned on the third fasten portion 312. In this embodiment, the second stop part 315 has a U shape. The fourth fasten portion 316 protrudes from the second stop part 315. In this embodiment, the fourth fasten portion 316 is a cylinder.

For a better understanding of the invention, we use an explicit example to explain the fastener according to a preferred embodiment of the invention.

Figure 9:
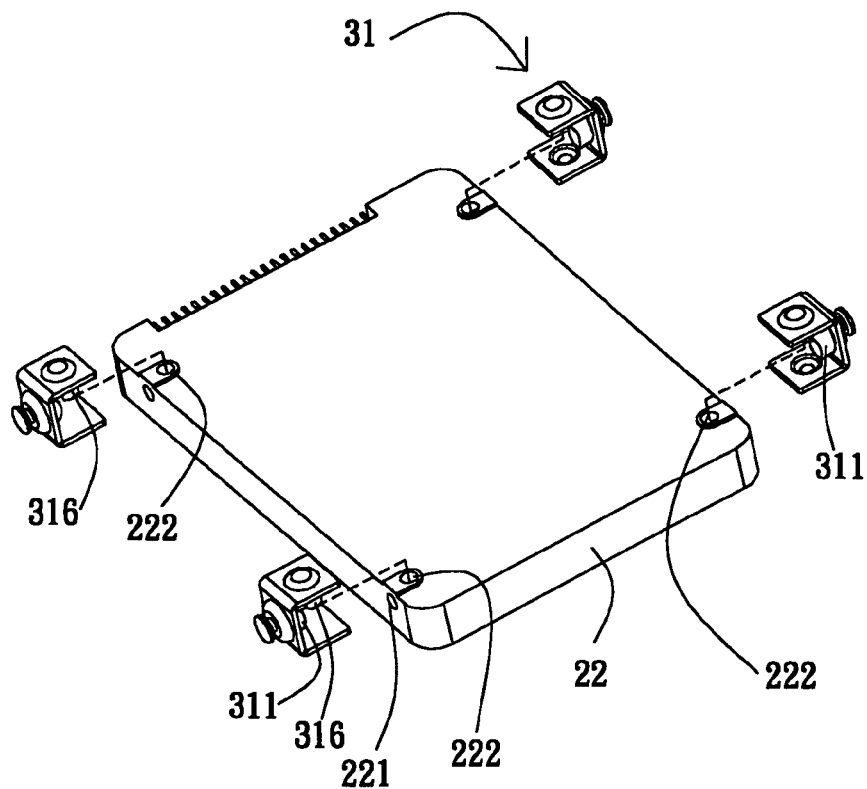
FIG. 9 is a schematic exploded view of the HDD and fastener according to the second embodiment of the invention.

As shown in FIG. 9, the second fasten portion 311 of the fastener 31 is buckled to the first hole 211 of the HDD 22. The fourth fasten portion 316 is buckled to the second hole 222 of the HDD 22. In this embodiment, four fasteners 31 are used to buckle the four first holes 221 and second holes 222 of the HDD 22. The first holes 221 are located on one side surface of the HDD, and the second holes 222 are located on a top surface of the HDD 22.

Figure 10:
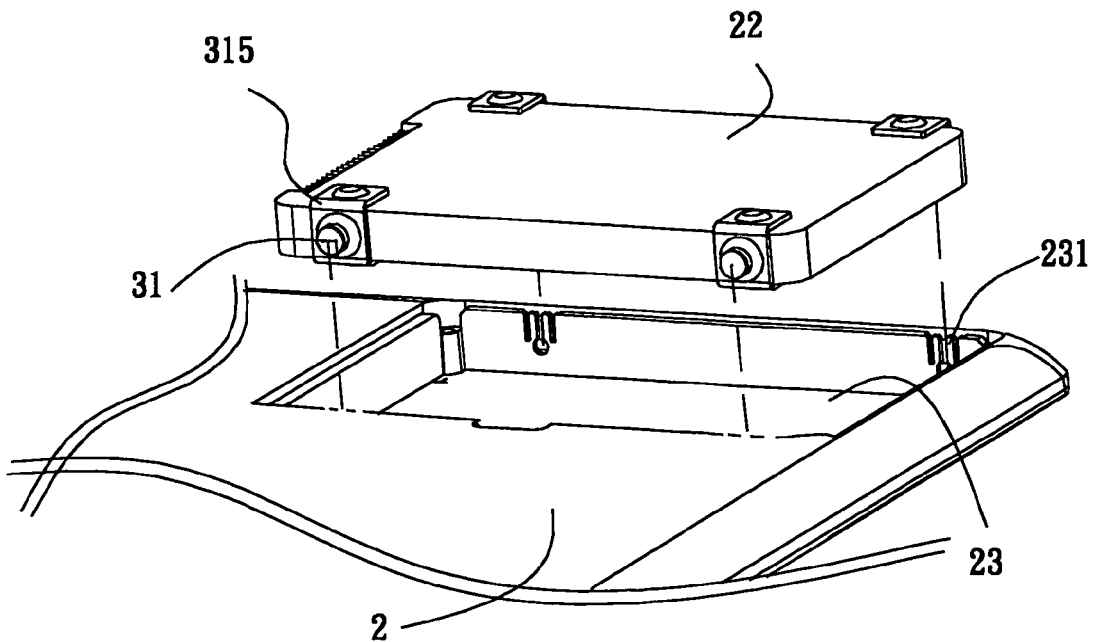
FIG. 10 is a schematic exploded view of the HDD, case and fastener according to the second embodiment of the invention.

As shown in FIG. 10, the second stop part 315 covers at least a part of the side surfaces and the top surface of the HDD 22. The HDD 22 is then buckled to the first fasten portion 231 of the case 2. In this embodiment, the first fasten portion 231 is set in the container 23, where the HDD 22 is disposed. Thus, the fastener 31 can buckle the first fasten portion 231 so as to fix the HDD 22 inside the case 2. Moreover, the fastener 31 can provide an anti-shocking effect if it is made of rubber.

Figure 11:
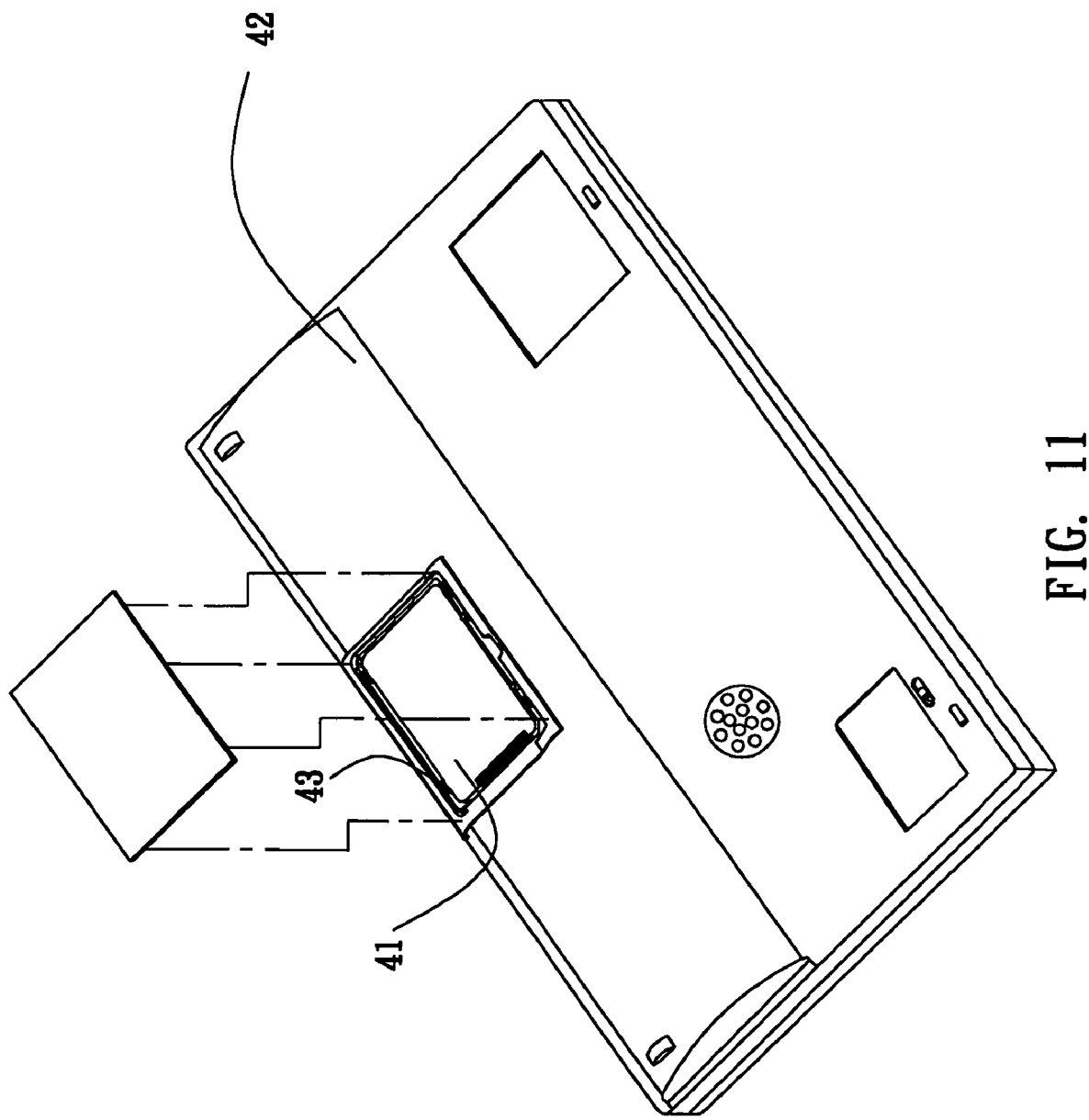
FIG. 11 is a schematic view of the bottom of an electrical apparatus according to a third embodiment of the invention.

As shown in FIG. 11, an electrical apparatus 4 according to a third embodiment of the invention contains an HDD 41, a case 42, and a plurality of fasteners 43. In this embodiment, the electrical apparatus 4 is a laptop computer. The configuration and composition of the HDD 44, the case 42, and the fasteners 43 are the same as those described in the previous embodiments, so the detailed descriptions are omitted for concise purpose.

In summary, the fastener of the invention uses the second fasten portion to buckle the first hole on the HDD and the third fasten portion to buckle the first fasten portion. This quickly completes the processing of fixing the HDD in the container. Therefore, the invention can reduce the HDD installation time. In addition, the fastener can provide anti-shocking effect if it is made of rubber. Moreover, the metal elastic slice makes the HDD and the computer have the same ground, so as to prevent the HDD from EMI.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A fastener for buckling a hard disk drive (HDD) to a first fasten portion of a case, the fastener comprising:
a second fasten portion, which buckles a first hole on the HDD; and
a third fasten portion, which has a first side connected to the second fasten portion, wherein at least one part of the third fasten portion buckles the first fasten portion so as to fix the HDD on the case
wherein the second fasten portion is a cylinder and includes at least a groove, the groove separates the second fasten portion into a plurality of second elastic arms, and the second elastic arms are inserted into the first hole so as to maintain the connection relation between the second elastic arms and the first hole.

2. The fastener of claim 1, wherein the first hole on the HDD is positioned at a side surface or a top surface of the HDD.

3. The fastener of claim 1, wherein the first fasten portion is positioned in a container of the case and comprises a plurality of first elastic arms, and at least one part of the third fasten portion buckles among the first elastic arms.

4. The fastener of claim 3, further comprising:
a first stop part, which is disposed on a second side of the third fasten portion, wherein a third side of the first stop part is in contact with a fourth side of the first fasten portion.

5. The fastener of claim 4, further comprising:
an elastic slice, which is disposed on the third fasten portion of the fastener, wherein when the fastener buckles among the first elastic arms, the first elastic arms are located between the elastic slice and the first stop part, the elastic slice is in contact with the HDD, and the HDD and the container are in electrical communications to prevent the HDD from electromagnetic interference (EMI).

6. The fastener of claim 1, further comprising:
a second stop part, which is disposed on the third fasten portion, wherein the second stop part has a U shape and covers at least one part of side surfaces and a top surface of the HDD.

7. The fastener of claim 6, further comprising:
a fourth fasten portion, which protrudes from the second stop part, and buckles a second hole of the HDD, wherein the second hole is positioned at a top/side surface of the HDD.

8. The fastener of claim 1, wherein the material of the fastener is rubber.

9. An electrical apparatus, comprising:
a hard disk drive (HDD), which has a plurality of first holes;
a case, which has a plurality of first fasten portions; and
a plurality of fasteners, which buckle the HDD to the first fasten portion, wherein each of the fasteners comprises a second fasten portion and a third fasten portion, the second fasten portion buckles one of the first holes on the HDD, the third fasten portion has a first side connected to the second fasten portion, and at least one part of the third fasten portion buckles the first fasten portion so as to fix the HDD on the case
wherein the second fasten portion is a cylinder and includes at least a groove, the groove separates the second fasten portion into a plurality of second elastic arms, and the second elastic arms are inserted into the first hole so as to maintain the connection relation between the second elastic arms and the first hole.

10. The electrical apparatus of claim 9, wherein the first hole on the HDD is positioned at a side surface or a top surface of the HDD.

11. The electrical apparatus of claim 9, wherein the first fasten portion is positioned in a container of the case and comprises a plurality of first elastic arms, and at least one part of the third fasten portion buckles among the first elastic arms.

12. The electrical apparatus of claim 9, further comprising:
a first stop part, which is disposed on a second side of the third fasten portion, wherein a third side of the first stop part is in contact with a fourth side of the first fasten portion.

13. The electrical apparatus of claim 12, further comprising:
an elastic slice, which is disposed on the third fasten portion of the fastener, wherein when the fastener buckles among the first elastic arms, the first elastic arms are located between the elastic slice and the first stop part, the elastic slice is in contact with the HDD, and the HDD and the container are in electrical communications to prevent the HDD from electromagnetic interference (EMI).

14. The electrical apparatus of claim 9, wherein the fastener further comprises a second stop part, the second stop part is disposed on the third fasten portion, and the second stop part has a U shape and covers at least one part of side surfaces and a top surface of the HDD.

15. The electrical apparatus of claim 14, wherein the fastener further comprises a fourth fasten portion, the fourth fasten portion protrudes from the second stop part and buckles at least a second hole of the HDD, and the second hole is positioned at a top/side surface of the HDD.

16. The electrical apparatus of claim 9, wherein the material of the fastener is rubber.

17. An electrical apparatus, comprising:
a hard disk drive (HDD), which has a plurality of first holes;
a case, which has a plurality of first fasten portions; and
a plurality of fasteners, which buckle the HDD to the first fasten portion, wherein each of the fasteners comprises a second fasten portion and a third fasten portion, the second fasten portion buckles one of the first holes on the HDD, the third fasten portion has a first side connected to the second fasten portion, and at least one part of the third fasten portion buckles the first fasten portion so as to fix the HDD on the case,
wherein the first fasten portion is positioned in a container of the case, the first fasten portion comprises a plurality of first elastic arms, a rectangular opening and a circular hole, the rectangular opening and the circular hole are connected with each other between the first elastic arms, the open width of the rectangular opening is smaller than the diameter of the circular hole, and the third fasten portion buckles the circular hole of the first fasten portion.

18. The fastener of claim 17, wherein the first hole on the HDD is positioned at a side surface or a top surface of the HDD.

19. The fastener of claim 17, wherein the first fasten portion is positioned in a container of the case and comprises a plurality of first elastic arms, and at least one part of the third fasten portion buckles among the first elastic arms and further comprising a first stop part, which is disposed on a second side of the third fasten portion, wherein a third side of the first stop part is in contact with a fourth side of the first fasten portion.

20. The fastener of claim 19, further comprising an elastic slice, which is disposed on the third fasten portion of the fastener, wherein when the fastener buckles among the first elastic arms, the first elastic arms are located between the elastic slice and the first stop part, the elastic slice is in contact with the HDD, and the HDD and the container are in electrical communications to prevent the HDD from electromagnetic interference (EMI).

21. The fastener of claim 17, wherein the material of the fastener is rubber.

* * * * *